United States Patent

[11] 3,577,039

| [72] | Inventors | Norman R. Sanford<br>Dayton, Ohio;<br>Heinrich J. Wieg, New Burlington, Ohio |
|---|---|---|
| [21] | Appl. No. | 794,526 |
| [22] | Filed | Jan. 28, 1969 |
| [45] | Patented | May 4, 1971 |
| [73] | Assignee | The Bendix Corporation |

[54] OPTICAL APPARATUS FOR FLAW DETECTION
7 Claims, 4 Drawing Figs.

[52] U.S. Cl............................................. 317/127,
250/220
[51] Int. Cl............................................. H01h 47/24
[50] Field of Search......................................... 250/220,
219 (D), 209; 317/127, 128; 28/51, 64

[56] References Cited
UNITED STATES PATENTS
2,892,951  6/1959  Linderman.................. 250/220

*Primary Examiner*—James D. Trammell
*Assistant Examiner*—Harry E. Moose, Jr.
*Attorneys*—Ernest T. Hix and Plante, Hartz, and Thompson ABSTRACT: There is disclosed an optical apparatus for flaw detection in which a traveling line of light is reflected from the surface of an object to an array of photocells. The outputs of the photocells are combined in a summing amplifier and changes in the output of the summing amplifier exceeding some predetermined amount above or below a normal value are used as a control or reject signal. Each of the individual photocells is compensated so that the same relative amount of change in the cell's light input produces the same amount of change in the signal seen at the output of the summing amplifier.

PATENTED MAY 4 1971  3,577,039

INVENTORS
NORMAN A. SANFORD
HEINRICH WIEG
BY Ernest J. Hix
THEIR ATTORNEY

OPTICAL APPARATUS FOR FLAW DETECTION

BACKGROUND OF THE INVENTION

This invention concerns an optical inspection device whereby a line on a portion of an object being inspected is illuminated by a suitable source, and light beams are reflected into photocells and the response from the photocells is used as a signal or indicator to show the presence of some flaw or defect or a change in surface characteristic producing a change in reflectivity of the object at the inspection zone. This object may be a traveling sheet of material that is moved past the inspection zone or, as in the case that will be herein shown more in detail, it may be the surface of a rotating member, such as a roller bearing or length of tubing. Devices have been proposed for scanning and optically inspecting an illuminated inspection zone and the use of a plurality of photocells for accomplishing this purpose is not new. The patent to Lippke U.S. Pat. No. 3,331,963 shows an apparatus for optically detecting flaws in sheet material using a group of six photocells in which the positive sides of the cells are connected to the negative sides of the adjacent cells. Such an arrangement is necessarily complicated and requires extensive electrical apparatus to accomplish its purpose. Numerous optical flaw detectors have a single point detection system using a single photocell to receive a reflected point of light. In the patent to Linderman U.S. Pat. No. 2,892,951 an optical inspection apparatus is shown that makes use of a series of photocells but with no provision for equalizing the effects of the different photocells to make each cell respond equally to the other cells when subjected to some specific amount of light input change. In accordance with the present invention, however, a line of light from a lamp source is directed onto an object, such as a rotating part, and is reflected into a photocell array to scan the length of line and detect any change or difference in the reflected light intensity over some predetermined signal strength.

Thus it is the object of the present invention to provide a comparatively simple electrical system and a single series or array of photocells to inspect an entire length of line on the moving surface of an object to be inspected and in which it is unnecessary to precisely equalize the amount of light received by each increment of length of the inspected line and unnecessary to exactly equalize the outputs of the various individual photocells themselves. In this invention, this simple system embodies compensating means to compensate signals along the length of the inspected line to provide a signal which can be amplified as a pulse and used to control a relay or reject apparatus when the signal thus produced varies excessively from some predetermined normal or permissible value or range.

SUMMARY OF THE INVENTION

This invention provides an optical inspection device embodying a simple arrangement of photocells and a comparatively simple electrical system for inspecting the whole length of an illuminated line on an object. The object as herein shown is a rotating roller bearing. Light from a suitable light source is supplied along the length of an inspection zone and is reflected into an array of photocells arranged one next to the other. Wherever a flaw may occur in the inspected material, it would temporarily cause more or less light to be reflected to the photocell that looks at that particular portion of the inspection zone line. This, of course, would produce a change of signal from that particular photocell. In this invention, all of the photocells are connected at a common side to a common connection. All the other similar sides of the photocells are connected to a summing amplifier which adds the signals of these cells. However, there is provision for each of these photocells where it is connected to the summing amplifier for compensating differences that might be produced by differences in the amount of illumination supplied to the respective portion of the inspection zone line or that might be produced because one photocell may be more sensitive to a particular degree of light supplied to it than another one of the cells. Each of the cells, therefore, is compensated so that in the particular system employed and the particular light source employed each cell has the same effect on the output of the summing amplifier as any of the other cells, so that a flaw of some particular magnitude would cause the same response change regardless of where it occurs along the inspection zone.

The output of the summing amplifier is connected through a capacitance connection so that only the electrical pulses obtained during operation are transmitted beyond this point. The capacitance connection goes to two amplifiers, one for amplifying a pulse caused by an increase in signal and the other for amplifying a pulse caused by a decrease in signal. One of these amplifiers thus acts as an inverter and the output of the two amplifiers is connected to a common trigger apparatus. When the trigger receives a signal above some predetermined safe or acceptable amount, regardless of whether that signal is caused by an increase or a decrease in the signal coming from the summing amplifier, it will operate and cause the operation of a relay or reject system that is controlled thereby. An arrangement such as this provides a very accurate system and is comparatively simple in that it uses merely a single array of photocells and a comparatively simple electrical amplifying and controlling apparatus and, although the total output of the summing amplifier may not be changed very much by any particular flaw producing some comparatively small change in the total amount of light going into the cells, nevertheless this comparatively small change may be employed very accurately because of the equalization of the effects of the photocells due to the compensating devices employed. Bright parts of high reflection as well as dull and dark parts can be inspected through the inverting arrangement provided.

DESCRIPTION OF THE PREFERRED EMBODIMENT

Figure 1:
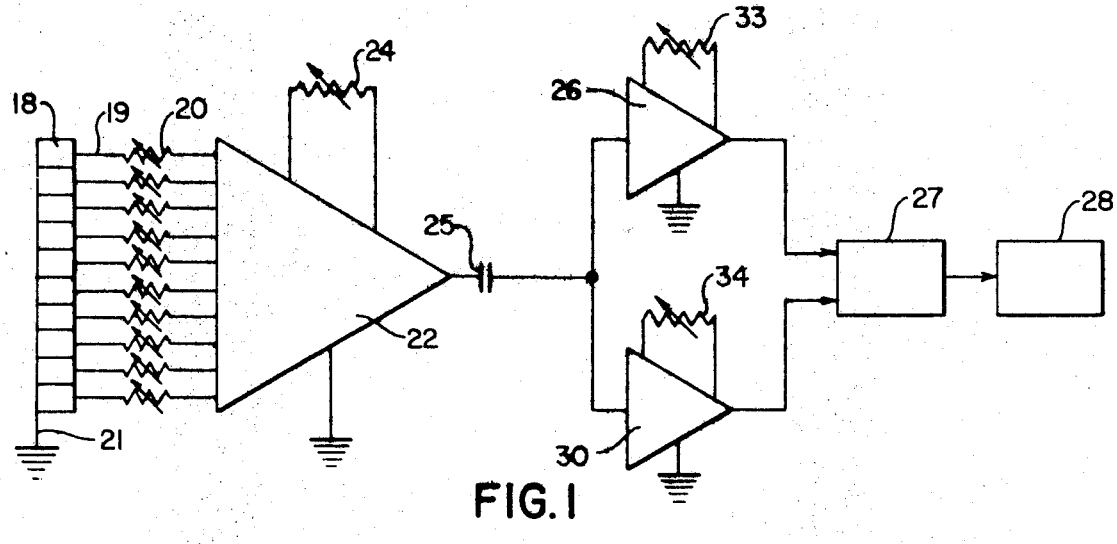
FIG. 1 is a diagrammatic illustration of the present invention.
Figure 2:
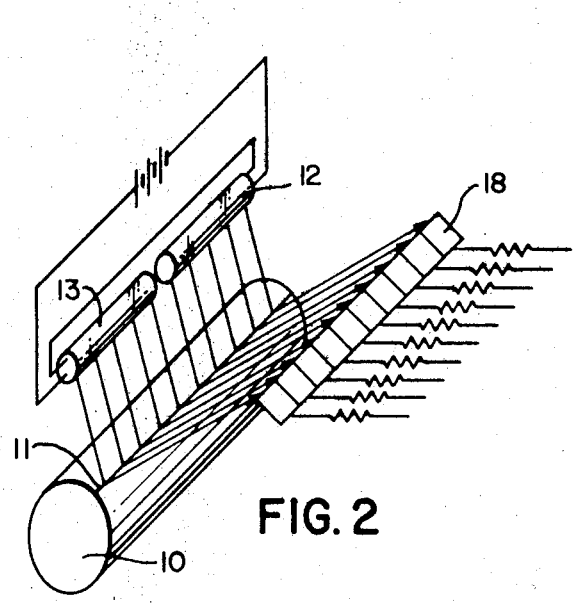
FIG. 2 is a schematic view illustrating the manner in which light is supplied to and reflected from a line on the object inspected.
Figure 4:
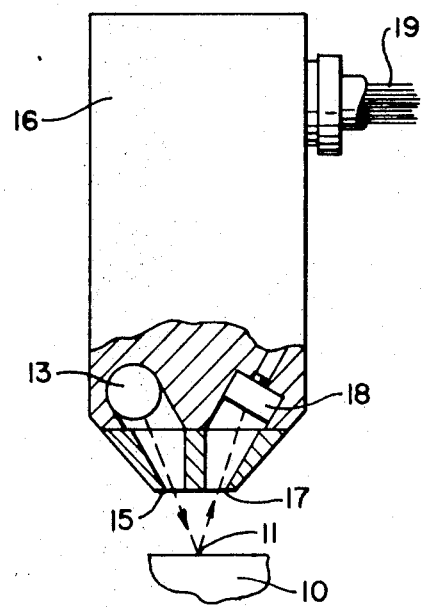
FIG. 4 is a view partly in section showing the inspection head in its relation to a part of an object to be inspected.

FIGS. 1 and 2 illustrate the application of the invention to the inspection of a line along a rotating roller bearing 10 for finding flaws or defects passing the inspection zone and producing a change in the amount of light reflected from the inspected surface. The inspection zone is a line 11 supplied by light from one or more lamps, two of which are shown at 12 and 13 in the embodiment illustrated. The light may be supplied through a mask or slot 15 provided in the inspection head which is generally designated 16, as in FIG. 4. Light is reflected from the inspection zone at 11 back through a slot 17 to an array of photocells generally designated 18 in the inspection head 16. These photocells are connected through individual wires 19 leading from the head. One side of the photocells has a common connection 21 such that similar sides of the photocells are all connected together and the other sides of the photocells are connected through wires 19 to adjustable or preselected compensators or resistances 20. There are connections from the compensators 20 to the summing amplifier 22 which, in effect, adds and amplifies the signals coming from the various photocells into a common output signal.

The slot or mask 15 through which the light passes to the object or roller 10 and the arrangement of the light bulbs 12 and 13 need not be precisely such as to equally illuminate all the parts of the inspection zone. And the various photocells 18 need not be such as to produce exactly the same amount of output change due to any given change in received light signal because the individual photocell units are each compensated by the compensators 20 to produce the same change in the summed signal as any other cell when affected by the same size flaw. Thus at any point along the line if a flaw occurs of some particular magnitude it would have the same effect on the total output of the summing amplifier as if it occurred at some other point along the line, even though that other point along the line would be illuminated with a different amount of light and inspected by a different cell.

Figure 3:
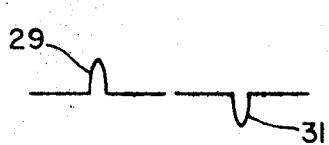
FIG. 3 illustrates a voltage change or pulse supplied from the summing amplifier caused by an increase and a change caused by a decrease in the amount of light temporarily supplied to the cell array.

An adjusting means 24 is provided for the summing amplifier to vary the amount of output signal for setup purposes. The amplified summed signal is supplied from the summing amplifier 22 through a capacitance connection 25 to an amplifier 26 which responds only to positive pulses such as the pulse 29 of FIG. 3 caused by an instantaneous increase in light signal as a flaw passes the inspection zone. Such a positive signal is amplified and transmitted to a trigger such as a Schmitt trigger 27 which, if the signal transmitted to it is of sufficient value, would operate and cause operation of a relay 28 connected to it. The relay 28 may serve to operate a reject signal or control. Also connected to the capacitance connection 25 is another amplifier 30 which amplifies only negative pulses as indicated at 31 in FIG. 3. Such a pulse would be caused by a defect that produces a smaller total signal on the summing amplifier 22 as when a dark spot passes the inspection zone. One of these two amplifiers 26 or 30, and herein shown as the amplifier 30, inverts its signal so that the effect on the trigger 27 is the same regardless of whether the initial signal is a pulse in a negative or in a positive direction. The capacitance 25 couples or transmits only changes in the signal from summing amplifier 22. It thus enables detection of the same relative size surface flaw, independent of the overall surface reflectivity which establishes the reference level. As will be obvious, the trigger 27 will not be caused to operate until a signal change or pulse that exceeds some normal or permissible value is passed to it, but at that time when a permissible level is exceeded, caused either by an increase or decrease in the amount of light signal coming from the summing amplifier, then the trigger will immediately operate the reject relay 28 or other indicating device. The two amplifiers 26 and 30 are provided with adjustable controls 33 and 34 respectively for setup and adjustment purposes.

As will be apparent, the device is responsive to changes in the amount of reflectivity at the inspection zone as will be caused by a flaw or a nick in the surface. If the flaw or nick in the surface is of sufficient magnitude, the apparatus will so indicate but will not respond to minor changes such as would be acceptable. Furthermore, it will also be apparent that the apparatus is not affected by the differences in background color and one bearing may have a slightly different color than the next without producing a temporary pulse of a magnitude sufficient to operate the device.

While the form of apparatus herein described constitutes a preferred embodiment of the invention, it is to be understood that the invention is not limited to this precise form of apparatus.

We claim:

1. Apparatus for detecting flaws and surface variations in an object comprising;

means for presenting different portions of an object to an inspection zone, means for illuminating a line on the object, an array of photocells for receiving light reflected from the illuminated line, a common connection to similar sides of the photocells, summing means connecting the other sides of the photocells for summing their individual outputs, means for individually compensating the photocells to substantially equalize the effects produced by the various photocells when viewing a flaw of some particular magnitude, and signal means operable in accordance with the amount of instantaneous changes in the summed output of the photocells.

2. Apparatus as set forth in claim 1, with means for amplifying a pulse in the summed outputs of the photocells.

3. Apparatus as set forth in claim 1, with discriminating means for determining whether the pulse is an increase or decrease in signal, with provision for operating the signal means with either an increase or decrease in the signal over some predetermined limit.

4. Apparatus as set forth in claim 1, together with a capacitance connection between the summing means and the signal means.

5. Apparatus as set forth in claim 1, the summing means being a summing amplifier;

means connecting thereto for amplifying a pulse caused by an increase in cell output, means also connected thereto for amplifying a pulse caused by a decrease in cell output, means for inverting one of those amplified signals, and a trigger means connected to both of the amplifying means for operation by either an increase or decrease in signal over some predetermined limit.

6. Apparatus for detecting flaws and surface variations in an object comprising:

means for presenting different portions of an object to an inspection zone;

means for illuminating a line on the object at the inspection zone;

an array of photocells for receiving light reflected from the illuminated line;

a common connection to similar sides of the photocells;

a summing amplifier;

means connecting the other sides of the photocells to the summing amplifier to sum the individual outputs of the cells into a single signal which changes from a normal signal in response to increases and decreases in the reflectivity of the illuminated line;

means for individually compensating the photocells to substantially equalize their effects on the summing amplifier when subjected to some specific change in the inspected zone; and amplifying means for amplifying pulses caused by a change in strength of the summed signal.

7. Apparatus as set forth in claim 6 in which a single line of photocells is used for receiving light from a single line of light reflected from the object inspected, and the means that illuminates the line supplies different degrees of illumination to different parts of the line and the photocells receive the light reflected from substantially the entire length of the line.